United States Patent
Shope

(10) Patent No.: US 10,798,936 B1
(45) Date of Patent: *Oct. 13, 2020

(54) POLE BRACKET FOR ANIMAL TRAPS

(71) Applicant: Casey W. Shope, Gladstone, MI (US)

(72) Inventor: Casey W. Shope, Gladstone, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/174,961

(22) Filed: Oct. 30, 2018

Related U.S. Application Data

(60) Provisional application No. 62/579,317, filed on Oct. 31, 2017.

(51) Int. Cl.
*A01M 23/24* (2006.01)
*F16M 13/02* (2006.01)

(52) U.S. Cl.
CPC .......... *A01M 23/245* (2013.01); *F16M 13/02* (2013.01)

(58) Field of Classification Search
CPC .... A01M 23/245; A01M 23/24; A01M 23/26; A01M 23/265; A01M 23/28; A01M 23/30; A01M 23/32; A01M 23/34; A01M 23/00; F16M 11/046; G09F 2007/1804; G09F 2007/1817
USPC ......... 248/125.1, 218.4, 219.1, 219.2, 219.3, 248/227.3, 300; 43/88, 89, 96
See application file for complete search history.

(56) References Cited

U.S. PATENT DOCUMENTS

| | | | |
|---|---|---|---|
| 1,858,713 A | 5/1932 | Martin | |
| 2,208,358 A | 7/1940 | Chandler | |
| 2,720,050 A | 10/1955 | Pfeiffer | |
| 4,152,861 A * | 5/1979 | Miller | A01M 23/245 248/121 |
| 4,267,660 A * | 5/1981 | Kielhorn | A01M 23/245 43/58 |
| 4,517,762 A * | 5/1985 | Venetz | A01M 23/245 43/96 |
| D286,741 S | 11/1986 | Clauss | |
| 4,766,694 A | 8/1988 | Buckley | |
| 5,052,733 A * | 10/1991 | Cheung | A47F 5/0892 248/340 |
| 6,116,556 A * | 9/2000 | Roth | E04H 12/24 248/200.1 |
| 6,131,354 A * | 10/2000 | Thompson | E05C 19/006 248/208 |
| 7,421,822 B1 * | 9/2008 | Ley | A01M 23/245 43/88 |
| 8,104,207 B2 * | 1/2012 | Pitcher | G09F 7/20 248/323 |
| 8,950,723 B1 | 2/2015 | Fogelstrom et al. | |
| 9,565,850 B2 * | 2/2017 | Hagerty | A01M 23/245 |

(Continued)

OTHER PUBLICATIONS

PCS Outdoors, 12 pack Asure Set Bodygrip Clamp with Duke 110, online catalog, 2017, 4 pages, www.pcsoutdoors.com, U.S.

*Primary Examiner* — Terrell L McKinnon
*Assistant Examiner* — Michael McDuffie
(74) *Attorney, Agent, or Firm* — Northern Michigan Patent Law, PLC

(57) ABSTRACT

A trap-holding bracket for holding both conibear style body-gripping traps and tang-equipped leg-hold type traps. The bracket comprises a hollow, generally box-shaped body with top, bottom, front, and rear walls, a tang slot in the front wall, and tab arms extending outwardly from the sides of the top and bottom walls to define extended jaw slots configured to receive and hold the inner wire ends of a body-gripping trap in their set position.

4 Claims, 6 Drawing Sheets

(56) References Cited

U.S. PATENT DOCUMENTS

| | | | |
|---|---|---|---|
| 10,492,485 B1* | 12/2019 | Shope | A01M 23/245 |
| 2005/0210734 A1* | 9/2005 | Nowack | A01M 23/245 |
| | | | 43/96 |
| 2007/0045491 A1 | 3/2007 | Spencer et al. | |
| 2018/0110215 A1* | 4/2018 | Harris | A01M 23/26 |

* cited by examiner

US 10,798,936 B1

POLE BRACKET FOR ANIMAL TRAPS

RELATED APPLICATIONS/PRIORITY BENEFIT CLAIM

This application claims the benefit of U.S. Provisional Application No. 62/579,317, filed Oct. 31, 2017 by the same inventor (Shope) the entirety of which provisional application is hereby incorporated by reference.

FIELD

The subject matter of the present application is in the field of devices for supporting animal traps off the ground on an elevated support.

BACKGROUND

Devices for holding or supporting animal traps on poles, sticks, and the like are generally known. These prior trap holders are generally designed to hold one of two basic types of trap: "conibear" or body-gripping type traps with inner wire jaw ends, and foot- or leg-holding traps with inner end mounting tangs.

U.S. Pat. No. 9,565,850 to Hagerty discloses a pole-mounted bracket with a planar midsection having a plurality of circular mounting apertures, and a planar angled end section with a plurality of elongated slots for receiving a tang on the inner end of a trap.

U.S. Pat. No. 2,720,050 to Pfeiffer discloses an underwater animal trap support with a hinged platform adjustably mounted on a pole or stake to hold the trap underwater, and to rotate like a weather vane in the underwater current.

U.S. Pat. No. 4,766,694 to Buckley discloses a trap holder in the form of a box with an open end for receiving the wire jaws of a trap, with notches in the side walls adapted to receive the spring arm of the trap to support the trap jaws in an upright position in the box.

Prior trap holders are often limited in terms of mounting options, the types of trap that they can hold, and/or the security and reliability of the connection between the holder and the trap.

BRIEF SUMMARY

I have invented a trap-supporting bracket primarily adapted to be mounted on a pole, stick, stake or similar vertical support (hereafter "pole"), but also useful for mounting on non-pole supports such as logs, trees, and rocks. The trap-supporting bracket is configured to hold "conibear" (body-gripping) type traps by their inner wire jaw ends, and to hold leg-hold type traps by a common type of tang protruding from the inner end of the trap. The inventive bracket has a novel structure designed to maximize a secure, non-slipping connection to the pole, in different orientations, while properly positioning and holding both types of trap at the desired height. The bracket also lends itself to being formed from a flat blank, reducing the cost and complexity of manufacture.

The bracket comprises a hollow, generally box-shaped bracket body comprising a top wall, a bottom wall, a front end wall, and a rear end wall, the hollow bracket body preferably having open sides. Aligned pole support apertures formed through the top and bottom walls allow a pole to be inserted through the hollow interior, and an opening in the rear end wall allows a bolt, screw, or similar pole-engaging member to be inserted through the rear end wall to lock the bracket in place on the pole. A larger pole can be inserted through the hollow interior via the open sides, either horizontally or, if the bracket is rotated, vertically. The front end wall includes at least one elongated slot for receiving a trap tang, and may further include non-pole mounting notches or apertures useful for securing the front end by wire, nail, or screw to natural supports such as trees, stumps, or logs.

Tab arms extend laterally from the side edges of the top and bottom walls to define spaced top and bottom jaw slots on both sides of the hollow bracket body, the jaw slots sized to receive and hold the spaced-apart inner jaw ends of a body-gripping trap when the trap is cocked or set.

The vertical pole support apertures preferably have front wedge ends to center the bracket against a pole as a bolt or screw operable from the rear end wall is tightened against the pole.

Terms of orientation such as "vertical", "horizontal", "top", and "bottom", should be understood in a general sense, and may depend on the installed orientation of the bracket and the orientation of any pole or other support to which the bracket is mounted. Terms of relative orientation such as "parallel" and "perpendicular" should be understood as being essentially rather than absolutely oriented in that manner.

These and other features and advantages of the invention will become apparent from the detailed description below, in light of the accompanying drawings.

DETAILED DESCRIPTION

Figure 1:
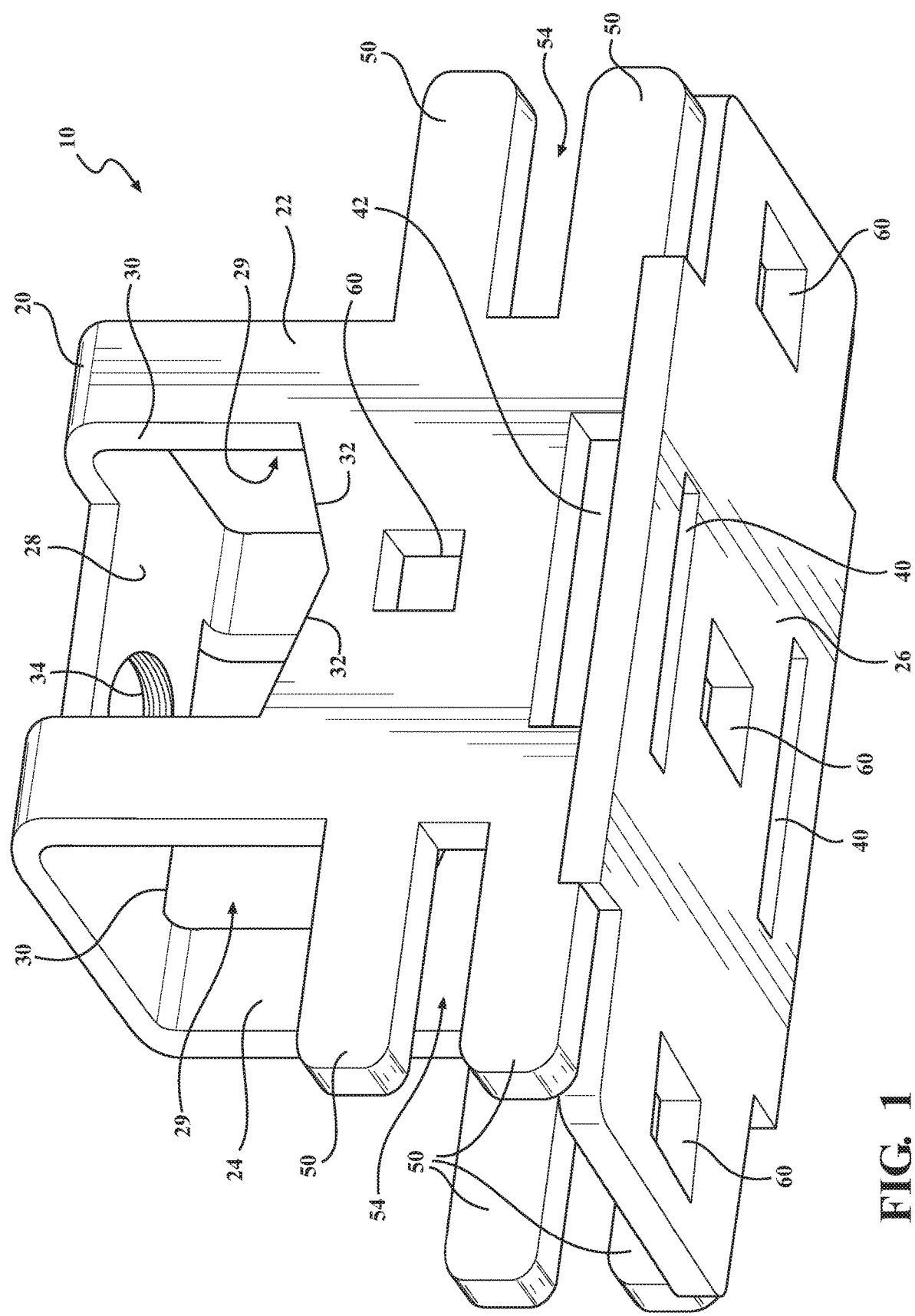
FIG. 1 is a perspective front view of an example trap-holding bracket according to the invention, with poles in different orientations shown in phantom lines extending through the bracket.
Figure 2:
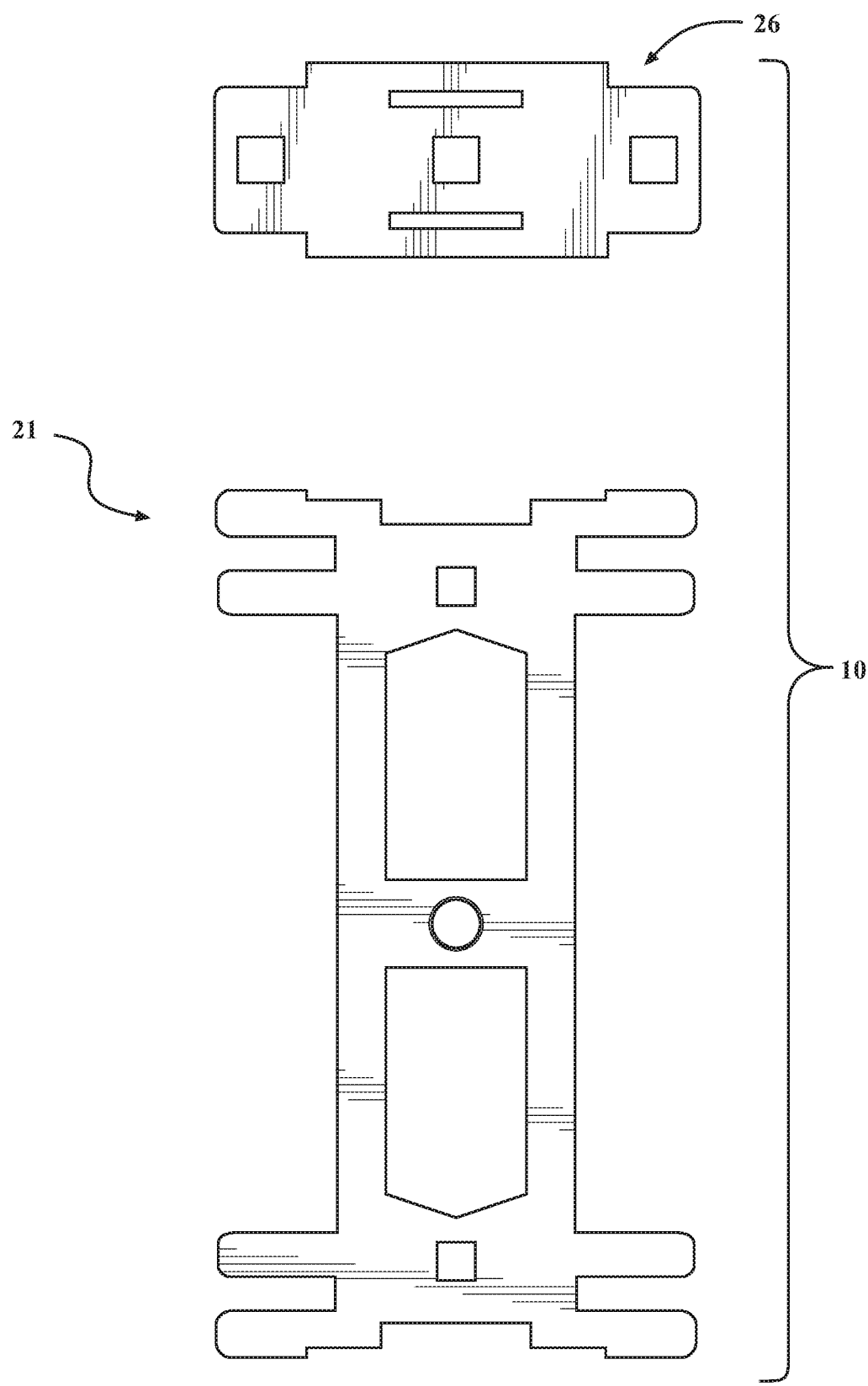
FIG. 2 is a plan view of a metal blank, in two pieces, from which the trap-holding bracket of FIG. 1 is formed.

Referring first to FIGS. 1 and 2, a trap-holding bracket 10 is shown in exemplary form in order to teach how to make and use the claimed invention. Bracket 10 comprises a hollow body 20 having a top wall 22, a bottom wall 24, a front end wall 26, and a rear end wall 28. In the illustrated example the bracket is formed from sheet metal, for example a heavy gauge stainless steel, although other metals or non-metal materials such as durable polymers could be used. The illustrated example further has open sides 29 as a preferred option, so that a horizontal pole or equivalent may inserted through the bracket body along axis X to support the bracket horizontally from a riverbank, for example; alternately, since the open sides 29 are larger than the vertical support apertures 30, bracket 10 can be rotated and mounted vertically on a larger pole inserted vertically through the re-oriented side openings 29.

Further in the illustrated example, best shown in FIG. 2, bracket 10 is formed in two pieces 21 and 26 (blank 26 in the illustrated example comprises the front end wall). The top, bottom, and rear end walls 20, 22, and 28 are formed from flat blank 21 and bent or formed into the generally box-shaped or cuboid structure shown in FIG. 1. Front end wall 26 is formed separately (also flat) and then attached to piece 21 in any known metal-joining manner (for example, welding, joint-forming adhesives, interference fit between parts, swaging, etc.) to close the front end of the hollow body 20.

Top and bottom walls 22, 24 include vertically aligned pole support apertures 30 so that a pole-like or pole-equivalent support P can be inserted vertically through hollow body 20 along axis Y. A bolt aperture 34 formed in the rear end wall 28 allows a bolt or similar pole-engaging/securing member 36 (FIGS. 3 and 4) to be inserted from the rear to clamp bracket 10 to the pole. Bolt aperture 34 may be threaded internally in order to draw and tension the bracket rearwardly against the pole as the bolt 36 is threaded forwardly through aperture 34.

In the illustrated example, pole support apertures 30 are generally square in shape, although their shape may vary, and the apertures may be formed with a wedge-shaped forward end defined by angled forward edges 32. The wedge shape helps to center and lock the bracket against a round pole P, or against an irregularly-shaped pole, as the clamping member 36 is urged forwardly.

Front end wall 26 includes one or more elongated horizontal slots 40, sized and shaped to receive the tang typically found on the inner end of leg-hold type traps, and sometimes on body-holding traps as well. There may be multiple slots 40, each of a different size (length and/or width), to accommodate tangs of differing width and thickness.

Top wall 22 and possibly other of the hollow body walls may also include one or more additional tang slots 42, in order to connect a tang-equipped trap to bracket 10 when the bracket is in a different orientation or mounted on a different type of support.

Still referring to FIGS. 1 and 2, tab arms 50 extend outwardly from the sides of top and bottom walls 22, 24, extending outwardly along in a direction generally parallel to front end wall 26 and spaced from each other along the top and bottom walls to form jaw slots 54. Upper and lower jaw slots 54 are vertically aligned between the top and bottom walls on their respective sides of the bracket body, and are sized to receive the wire or rod-shaped inner ends of the jaws of a conibear type trap when the inner ends are squeezed together to a cocked or set position. While in the illustrated example a single vertically-spaced pair of upper and lower jaw slots 54 is formed on each side of the bracket body 20, it is possible to add additional tabs 50 to the sides of the top and bottom walls in order to form additional sets of jaw slots along the sides of the bracket body. The dimensions of tab arms 50 and jaw slots 54 may vary depending on the size or model of the trap being supported therein.

If front end wall 26 is wider than hollow body 20, as shown in the illustrated example, the outer protruding ends of front end wall 26 (adjacent and outwardly of apertures 60 in the illustrated example, extending approximately the same distance outwardly as the tab arms 50) may form (or include a portion of) the front tab arms to help define jaw slots 54. For example, if the front tab arms 50 closest to front end wall 26 were omitted, the outer protruding ends of front end wall 26 would function as front tab arms to define jaw slots 54 between the outer protruding ends and the rear tab arms 50.

Bracket 10 is also provided with small apertures 60 on the front end wall 26, and optionally on other of the body walls, suitable for inserting supplemental fasteners such as screws, nails, or wire in order to attach bracket 10 to non-pole supports such as trees, logs, and rocks. Instead of pictured apertures 60, it is also possible to move one or more of the outer apertures 60 to the side edges of the front end wall to form open notches along the side edges of the front wall for use as fastening points, particularly if using wire.

Figure 3:
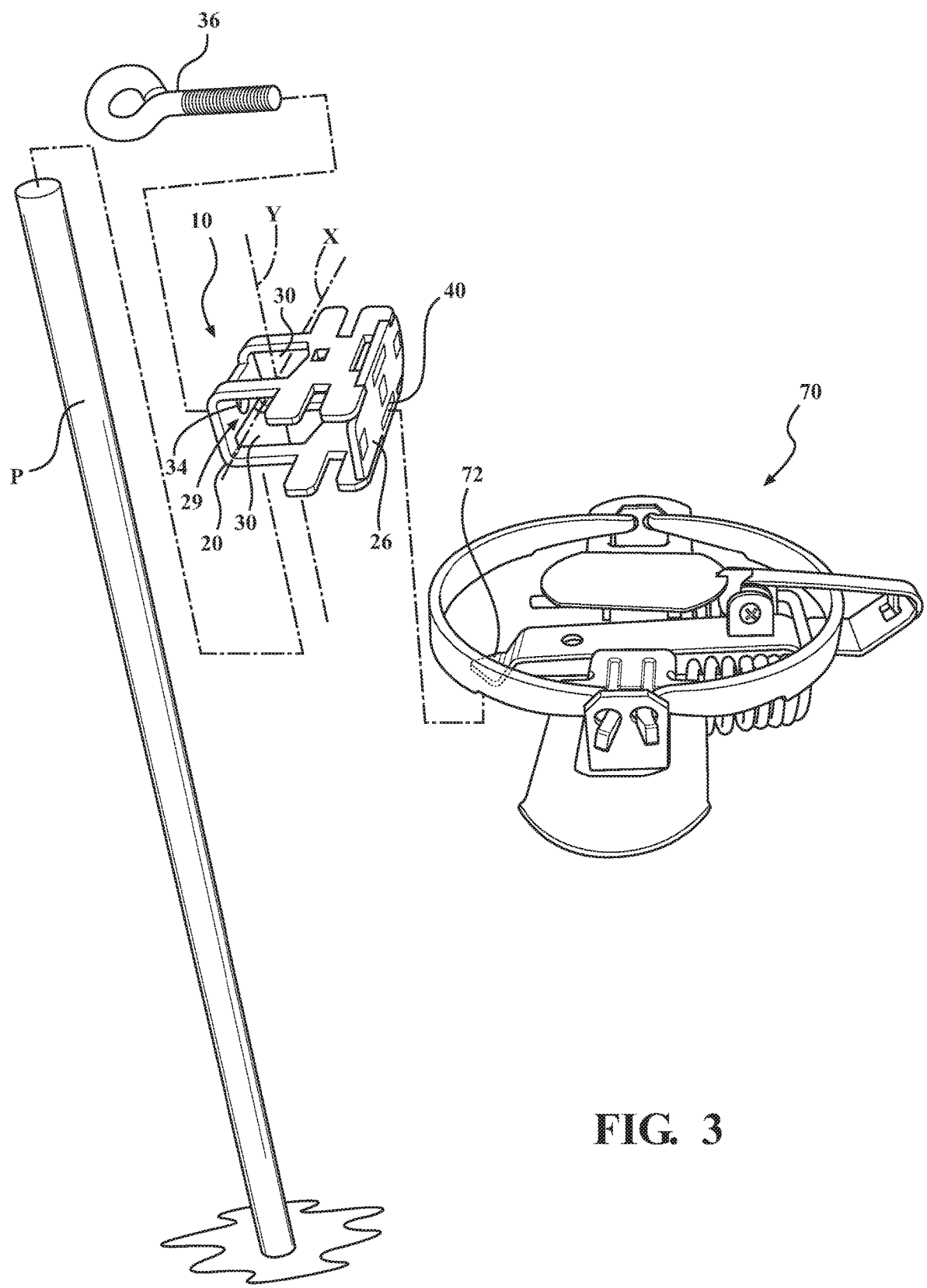
FIG. 3 is a perspective view of the trap-holding bracket of FIG. 1 mounted on a pole extending through the bracket, the bracket supporting a first type of trap.

FIG. 3 is a perspective view of the trap-holding bracket 10 of FIG. 1, mounted on a pole P extending through the bracket, the bracket 10 supporting a leg-hold type trap 70. Pole P is inserted into firm ground or the bottom of a shallow body of water, the pole support apertures 30 are aligned over the pole, and bracket 10 is slid down the pole to the desired height. Bolt 36 is then threaded through bolt aperture 34 into clamping engagement with pole P to lock bracket 10 at the desired height. Trap 70 includes a tang 72 at its inner end, and inserting the tang into one of the slots 40 in the front end wall 26 of bracket 10 is sufficient to hold the trap in place securely.

Bracket 10 holds the set trap in a desired trapping position at a predetermined height and rotational angle on pole P, for example next to the entrance or exit of an animal's home, or along a route the animal is expected to travel. The trap may be released from bracket 10, however, by the force of the jaws springing shut when the trap is sprung, and/or by the animal's movement when trapped, with the tang popping or being pulled out of the slot 40 on the bracket. Such traps are typically provided with a retaining chain, wire, or cable such as 75 that can be connected to a portion of the bracket or to the pole P, so that the released trap cannot be dragged away by an animal or by the current in a body of water.

Figure 4:
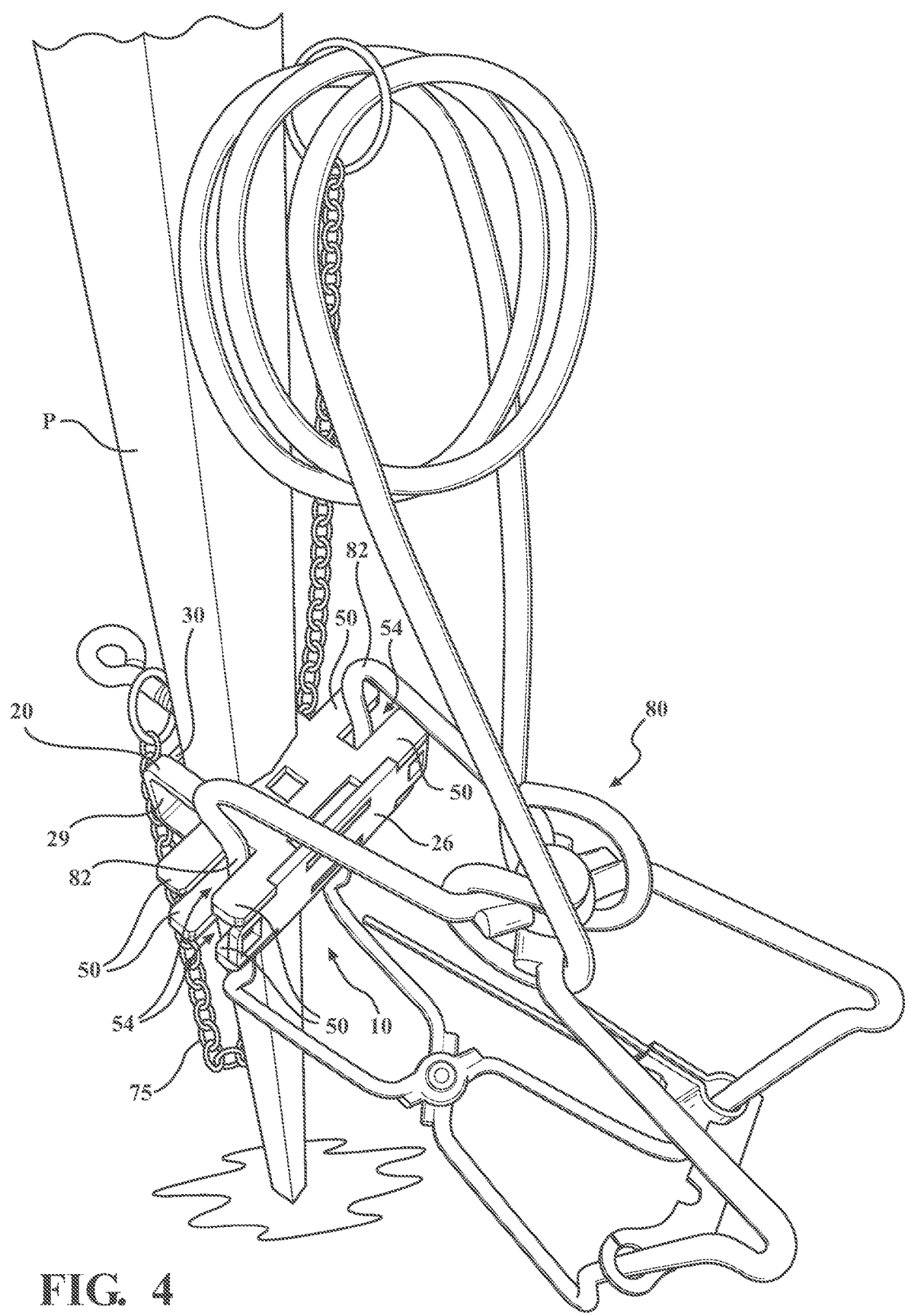
FIG. 4 is a perspective view of the trap-holding bracket of FIG. 1 mounted on a pole extending through the bracket, the bracket supporting a second type of trap.

FIG. 4 is a perspective view of the trap-holding bracket 10 of FIG. 1, mounted on a pole P extending through the bracket as in FIG. 3, the bracket supporting a body-holding type trap 80. Traps such as 80 include inner ends 82 made of stiff rod or wire (hereafter "wire"), capable of being forced inwardly and locked in place by a trigger mechanism in known manner to set the trap. With bracket 10 secured in place on pole P, the inner ends 82 of trap 80 can be squeezed together into jaw slots 54 to the set position. The spacing of the inner ends 82 in the trap's set position is less than the distance between the outer ends of the tab arms 50 on opposite sides of the bracket, so that the trap cannot be removed either horizontally or vertically from bracket 10 until the trap is sprung, releasing inner ends 82 to open outwardly and exit the bracket's jaw slots 54. At that point the trap 80 may fall free of bracket 10, but is retained by the chain 75 to the bracket, or to the pole, or to a nearby anchor such as a rock, log, tree, etc.

Figure 5:
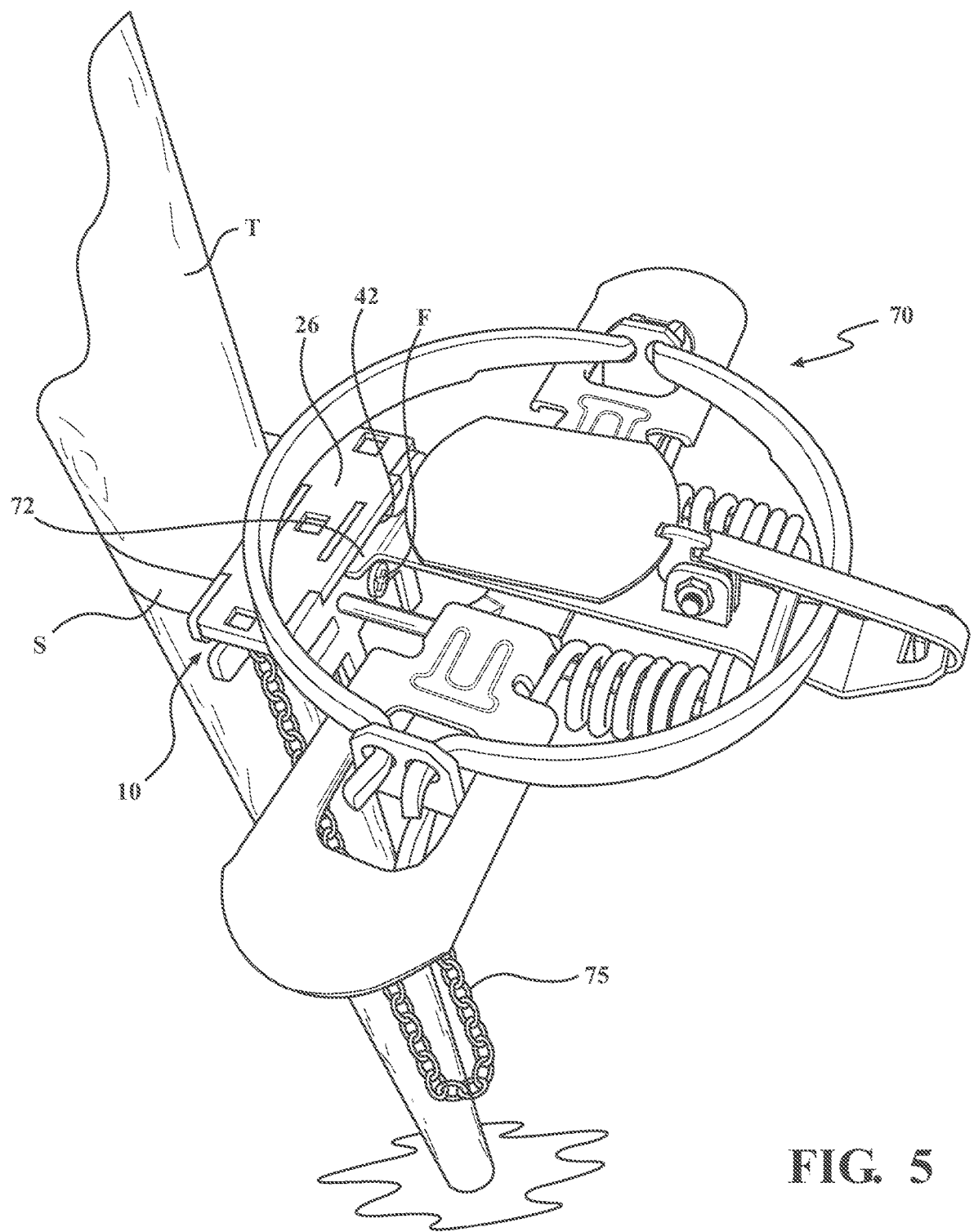
FIG. 5 is a perspective view of the trap-holding bracket of FIG. 1 mounted on a tree.

FIG. 5 shows bracket 10 reoriented with front end wall 26 facing upwardly, and bottom wall 24 held against the side of a tree T by either a wire or similar wrap device S wrapped around the tree and through one or more of the apertures in bracket 10, or by a fastener F such as a screw or nail inserted through an aligned set of supplemental fastener apertures 60 formed in the top and bottom walls 22, 24 of the hollow body 20. Bracket 20 in this orientation may hold a tang-equipped trap either vertically or horizontally via one of the exposed tang slots 40 or 42 if the trap has a tang, or the bracket may hold a body-gripping type trap vertically by its inner wire jaw ends 82 in jaw slots 54.

Figure 6:
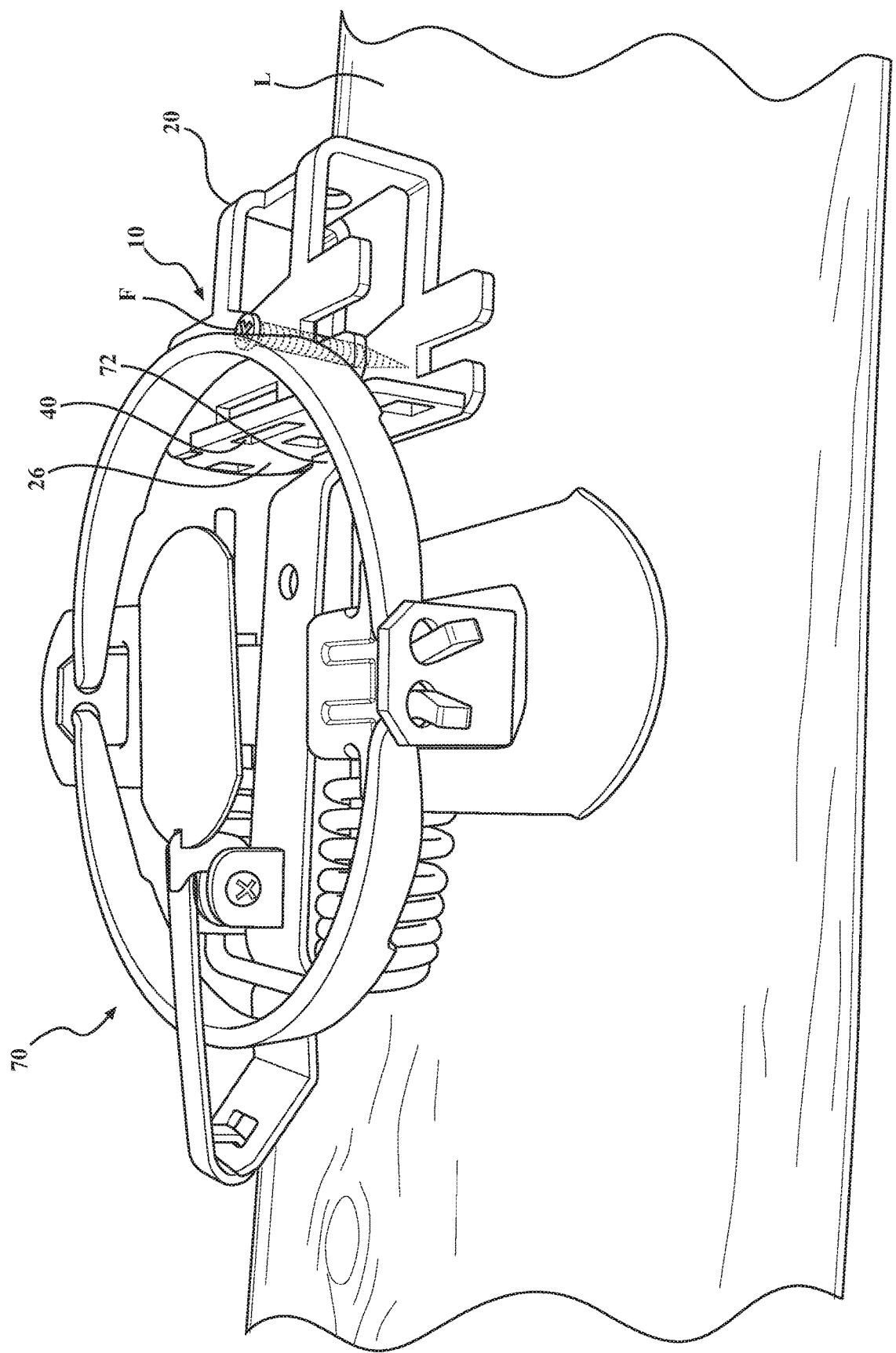
FIG. 6 is a perspective view of the trap-holding bracket of FIG. 1 mounted on a log.

FIG. 6 shows bracket 10 mounted on a horizontal log L, also with a screw or nail fastener F inserted through the aligned supplemental fastener apertures in the top and bottom walls 22, 24 of the bracket's hollow body 20. The flat faces of the top and bottom walls, and the aligned tab arms 50, 52 extending from opposite sides of the top and bottom walls, provide a wide, flat, stable support for the bracket against various mounting surfaces, especially useful in the horizontal bracket position shown in FIG. 6.

It will finally be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports in this application or in any other application claiming priority to this application.

The invention claimed is:

1. A trap-holding bracket for holding leg-hold and body-gripping type traps by their respective inner tang and wire jaw ends on an elevated support, the trap-holding bracket comprising:

a hollow generally box-shaped bracket body comprising a top wall, a bottom wall, a front end wall, and a rear end wall defining a hollow interior therebetween;

aligned pole support apertures formed through the top and bottom walls and defining a vertical through-opening configured to allow a pole to be inserted through the hollow interior, and an opening in the rear end wall generally at right angles to the pole support apertures and configured to allow a pole-engaging member to be inserted through the rear end wall to secure the bracket in place on the pole;

spaced tab arms extending outwardly from opposite sides of the top and bottom walls to define sets of vertically-spaced and vertically-aligned horizontal jaw slots outwardly of the hollow interior, the jaw slots configured to receive and hold inner wire ends of a body-holding trap in their inwardly-pressed set position between the spaced tab arms; and, an elongated tang slot formed in the front end wall, the elongated tang slot being generally parallel to the tab arms and configured to receive a tang on an inner end of a leg-hold trap.

2. The trap-holding bracket of claim 1, wherein the bracket body has substantially open sides defining a horizontal through-opening.

3. The trap-holding bracket of claim 2, wherein the horizontal through-opening is of greater size than the vertical through-opening defined by the pole support apertures in the top and bottom walls.

4. The trap-holding bracket of claim 1, wherein the front end wall is wider than the top wall, the bottom wall, and the rear end wall, such that outer ends of the front end wall protrude outwardly beyond the hollow interior generally parallel to the tab arms on opposite sides of the bracket body.

* * * * *